(12) United States Patent
Hartzheim

(10) Patent No.: US 6,766,647 B2
(45) Date of Patent: Jul. 27, 2004

(54) METHOD FOR IGNITION AND START UP OF A TURBOGENERATOR

(75) Inventor: Anthony A. Hartzheim, Palm Beach, FL (US)

(73) Assignee: Elliott Energy Systems, Inc., Stuart, FL (US)

(\*) Notice: Subject to any disclaimer, the term of this patent is extended or adjusted under 35 U.S.C. 154(b) by 0 days.

(21) Appl. No.: 10/205,002

(22) Filed: Jul. 25, 2002

(65) Prior Publication Data

US 2003/0056522 A1 Mar. 27, 2003

Related U.S. Application Data

(60) Provisional application No. 60/308,428, filed on Jul. 27, 2001.

(51) Int. Cl.[7] .................................................. F02C 7/26
(52) U.S. Cl. .............................. 60/778; 60/787; 60/788; 60/790

(58) Field of Search ........................... 60/788, 790, 786, 60/787, 778

(56) References Cited

U.S. PATENT DOCUMENTS

| | | | |
|---|---|---|---|
| 3,520,133 A | | 7/1970 | Loft et al. |
| 3,844,112 A | \* | 10/1974 | Harrison ...................... 60/790 |
| 4,378,673 A | | 4/1983 | Abo et al. ................ 60/39.141 |
| 4,380,146 A | | 4/1983 | Yannone et al. ......... 60/39.141 |
| 6,035,626 A | \* | 3/2000 | Wahl et al. .................... 60/788 |

\* cited by examiner

*Primary Examiner*—Ted Kim
(74) *Attorney, Agent, or Firm*—Webb Ziesenheim Logsdon Orkin & Hanson, P.C.

(57) ABSTRACT

A method for ignition and start up of a gas turbine engine in which the fuel flow is supplied to the combustor at a substantially constant rate for ignition and the gas turbine engine is ramped up at a preset acceleration rate to a speed to provide a supply of combustion air to the combustor in order to achieve the correct fuel-to-air ratio for ignition.

18 Claims, 6 Drawing Sheets

METHOD FOR IGNITION AND START UP OF A TURBOGENERATOR

CROSS-REFERENCE TO RELATED APPLICATION

This application claims the benefit of U.S. Provisional Patent Application bearing Serial No. 60/308,428 filed Jul. 27, 2001, which is hereby incorporated by reference.

BACKGROUND OF THE INVENTION

1. Field of the Invention

This invention relates generally to the field of gas turbine engines for the generation of electricity and, more particularly, to a method for ignition and start up of a turbo generator.

2. Description of the Prior Art

The starting of a gas turbine engine is a complex operation. Typically, before the gas turbine engine can run on its own power, the engine must be accelerated by an external source, such as a battery, to provide sufficient airflow to the combustor for ignition, typically referred to in the industry as light-off. In a turbogenerator having a permanent magnet motor/generator coupled to a gas turbine engine, supplying electrical power to the permanent magnet motor/generator will function as a motor to drive the gas turbine engine. Typically, engine speed varies as a function of the torque versus speed characteristics of the starter motor.

The combustion air to the combustor increases generally with gas turbine engine speed. Ignition occurs when the speed of the engine produces enough combustion air to produce the correct ratio of air with the fuel supplied. In order to obtain this correct fuel-to-air ratio, the amount of fuel flow to the gas turbine engine is actively controlled as a function of the speed of the gas turbine. However, fuel flow is highly dependent upon ambient conditions, such as atmospheric pressure and temperature.

Typically, in order for the correct fuel-to-air ratio to be achieved for light-off, atmospheric pressure and temperature must be accurately known or, otherwise, the representation of fuel flow will not be accurate and throw off the fuel-to-air ratio. In addition, any deviation in the measurement of gas turbine engine speed, or in the correlation of combustion air with gas turbine engine speed, can easily throw off achieving the correct fuel-to-air ratio for ignition. Therefore, in a prior art starting procedure where speed (combustion air) and fuel flow are variable, ignition is not attempted until the correct fuel-to-air ratio is thought to have been achieved, generally through experience.

In another prior art starting procedure for gas turbine engine ignition, the gas turbine engine operates at a fixed speed to provide a substantially constant supply of combustion air for light-off, while the fuel flow is variable. The fuel flow is then ramped up to achieve the correct fuel-to-air ratio, at which point ignition occurs. This fixed speed method is insensitive to fuel control variations, gas turbine engine variations, and ambient conditions.

In any starting method for a gas turbine engine, after ignition occurs, the accelerator rate of the turbine engine increases rapidly thereby increasing the air flow. The exhaust gas temperature also increases rapidly indicating that light-off has occurred. A controlled accelerator rate of the gas turbine engine after ignition provides cooler exhaust gas temperatures resulting in consistent and smoother start up. A smoother start up helps prevent over-temperature and saves energy.

It is, therefore, an object of the present invention to provide a consistent and controllable method for ignition and start up of a gas turbine engine.

SUMMARY OF THE INVENTION

The present invention is a method for ignition and start up of a gas turbine engine that includes the following steps. First, ambient conditions and fuel heating value is determined. The ambient conditions can include ambient temperature and atmospheric pressure. Second, the gas turbine engine is accelerated at a preset acceleration rate to a speed to provide a supply of combustion air to the combustor for ignition of the gas turbine engine. The preset acceleration rate of the gas turbine engine is determined based upon the ambient conditions and the fuel heating value. Acceleration of the gas turbine engine is achieved by applying electrical assistance, such as battery power, whereby a turbine drive shaft rotates causing compressor blades and turbine blades to rotate. Third, an ignition source, such as an igniter, is activated in the combustor of the gas turbine engine based upon the ambient conditions and the speed-of-rotation of the compressor blades and the turbine blades of the gas turbine engine. Fourth, a flow of fuel is supplied to the combustor at a substantially constant rate to provide an optimum supply of fuel to the combustor. The supply of fuel at this constant rate is maintained until the correct fuel-to-air ratio is achieved and ignition of the gas turbine engine occurs. After initiating the flow of fuel at a substantially constant rate, the fuel flow is increased non-decreasingly until the engine drives a load. Fifth, ignition of the gas turbine engine is sensed by using a heat sensor located adjacent the turbine exhaust gases to measure exhaust gas temperature of the gas turbine engine. Sixth, the acceleration rate of the gas turbine engine after ignition is controlled. Seventh, electrical assistance to the gas turbine engine is eliminated based upon a fixed value of the rotational speed of the turbine blades of the gas turbine engine. This fixed value is determined by the torque versus speed characteristics of the starter motor. Eighth, the flow of fuel to the combustor is ramped up to increase the speed of the gas turbine engine to a final speed to which a load can be applied. Finally, the acceleration rate of the gas turbine engine after the flow of fuel is ramped up to the combustor is controlled.

The combustor can also have a multiple number of fuel orifices. The fuel orifices can be in fluid communication with either a single fuel source or multiple fuel sources. However, in a situation where the combustor is idled at an idle speed, fuel can be supplied to the combustor at a constant flow rate, so that the combustor is operating at a slower idle speed without any electrical assistance to the gas turbine engine.

In a situation where ignition does not occur after a fixed period of time at the constant flow rate of fuel, the fuel flow rate is increased until ignition does occur. If ignition is still not achieved after a specified period of time, the system is stopped and purged.

BRIEF DESCRIPTION OF THE DRAWINGS

A complete understanding of the invention will be obtained from the following description when taken in connection with the accompanying drawing figures wherein like reference characters identify like parts throughout.

BRIEF DESCRIPTION OF THE PREFERRED EMBODIMENT

In a gas turbine engine, inlet air from the gas turbine compressor is continuously compressed, mixed with fuel in an inflammable proportion, and then contacted with an ignition source to ignite the mixture which will then continue to burn. Heat energy is released causing combustion gases to flow across a turbine where it is converted to rotary energy for driving equipment, such as an electrical generator. The combustion gases are then exhausted to the atmosphere. A method for ignition and start up of a gas turbine engine according to the present invention occurs in a combustor.

Figure 1:
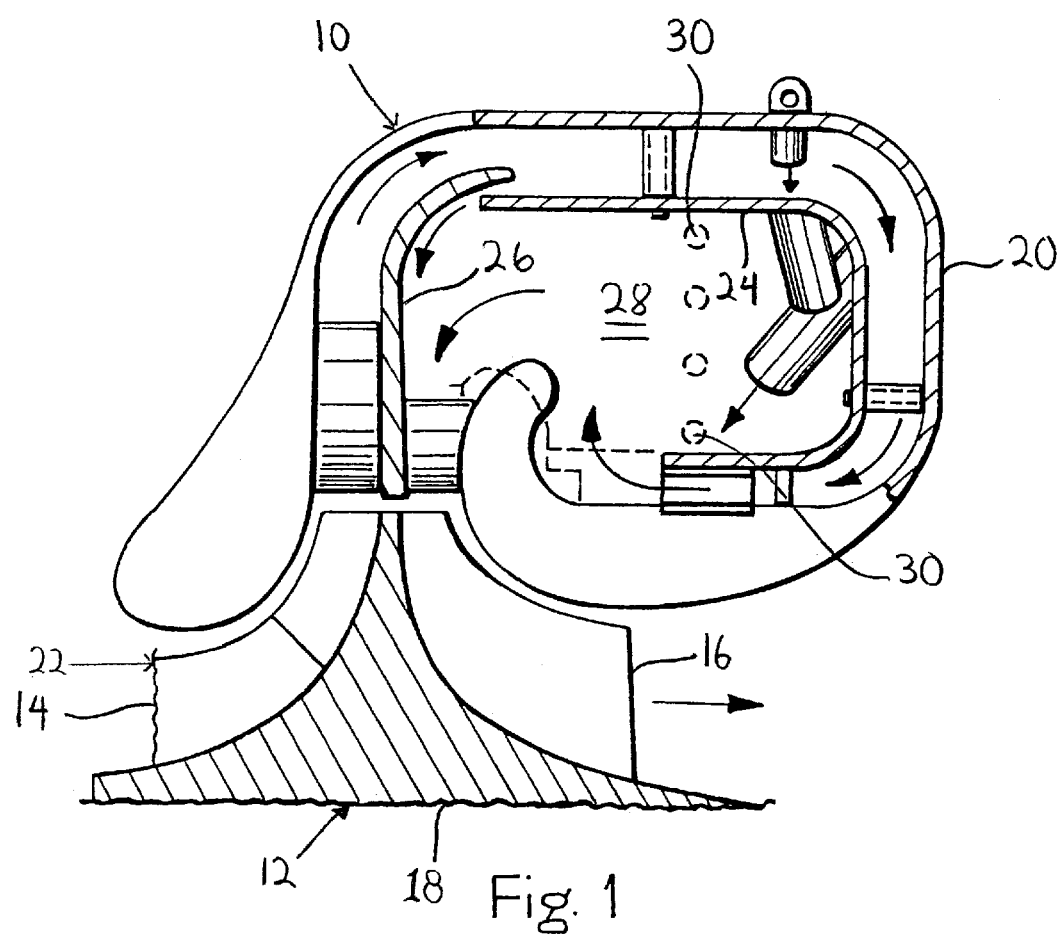
FIG. 1 is a partial-sectional view of a portion of an annular combustor.

FIG. 1 shows a partial cross section of a portion of a combustor 10 connected to a compressor/turbine arrangement 12. Arrangement 12 includes compressor blades 14 and turbine blades 16 positioned around an engine rotor or turbine drive shaft 18.

The combustor 10 includes an annular outer housing wall 20 defining an air intake passage 22 positioned adjacent the compressor blades 14. An outer combustor liner wall 24 and an inner housing wall 26 define an annular combustion chamber 28. The combustion chamber 28 includes a plurality of fuel orifices 30 for supplying fuel to the combustor 10 for ignition.

A detailed description of the annular combustor 10 is described in PCT Patent No. WO 98/25082, which is hereby incorporated by reference.

Figure 2:
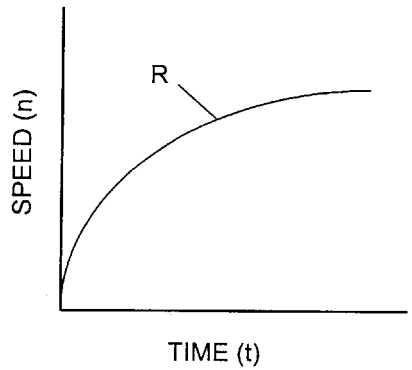
FIG. 2 is a graph of gas turbine engine speed versus time for a prior art gas turbine engine light-off method.
Figure 3:
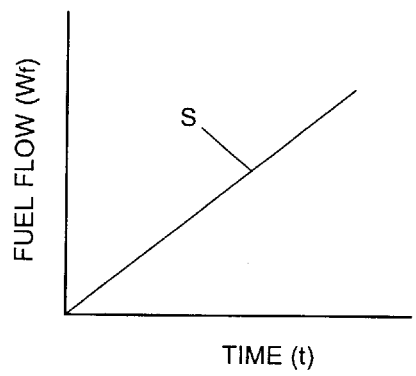
FIG. 3 is a graph of fuel flow to a gas turbine engine versus time for a prior art gas turbine engine light-off method.

FIGS. 2 and 3 graphically show a prior art gas turbine engine ignition method or starting procedure. Referring to FIG. 2, the gas turbine engine speed "n" is increased with time "t" during the starting procedure, generally along the curved line "R". At the same time, the fuel flow "Wf" is increased versus time "t" in the generally straight line "S" in FIG. 3. In the prior art, in order for the correct fuel-to-air ratio to be achieved for ignition, atmospheric pressure and temperature must be accurately known; otherwise, the representation of fuel flow "Wf" would not be accurate, thereby throwing off the fuel-to-air ratio. Likewise, any deviation in the measurement of gas turbine engine speed, or in the correlation of combustion air with gas turbine engine speed, can easily throw off achieving the correct fuel-to-air ratio for ignition. In the prior art starting procedure, both engine speed "n" and fuel flow "Wf" vary with time "t". With both the "n" and "Wf" varying, the prior art starting procedure is extremely sensitive to fuel control variations, gas turbine engine variations, sensor accuracy, and ambient conditions. For example, starting a gas turbine engine at low temperatures and high altitudes can be very troublesome in achieving the correct fuel-to-air ratio for ignition.

Figure 4:
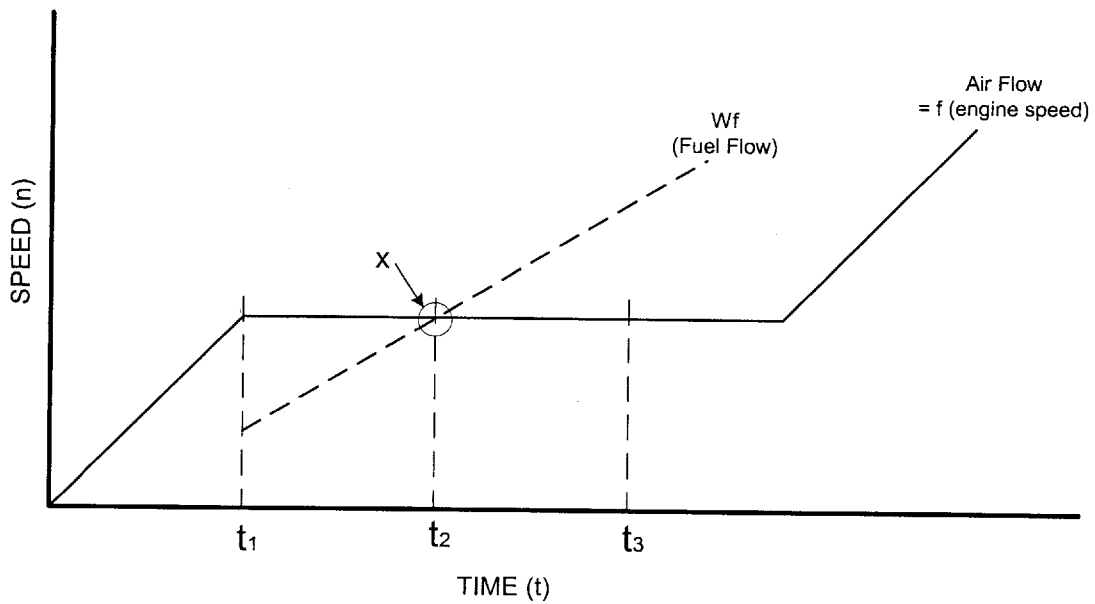
FIG. 4 is a graph showing operational speed versus time of a prior art gas turbine engine.

FIG. 4 shows a prior art gas turbine engine fixed speed ignition method shown by a graphical presentation of engine air flow "f" and fuel flow "Wf" versus time "t". In this prior art, at time "$t_1$", fuel flow is initiated as shown by dashed line "Wf". After an initial level, the fuel flow "Wf" is increased at a constant rate until it crosses line "f", which represents airflow. Where these two lines "Wf" and "f" intersect, at point "X" is where the correct fuel-to-air ratio for ignition is achieved, which occurs at time "$t_2$". The ignition source in the combustor will be turned on at time "$t_1$" and ignition will occur at time "$t_2$". Once ignition does occur, the airflow "f" will increase as gas turbine engine speed "n" increases. At time "$t_3$" when the exhaust gas temperature rise indicates that ignition has occurred, fuel flow is then controlled as a function of acceleration or exhaust gas temperature limit. This prior art starting procedure is insensitive to fuel control variations, gas turbine engine variations, and ambient conditions.

Figure 5:
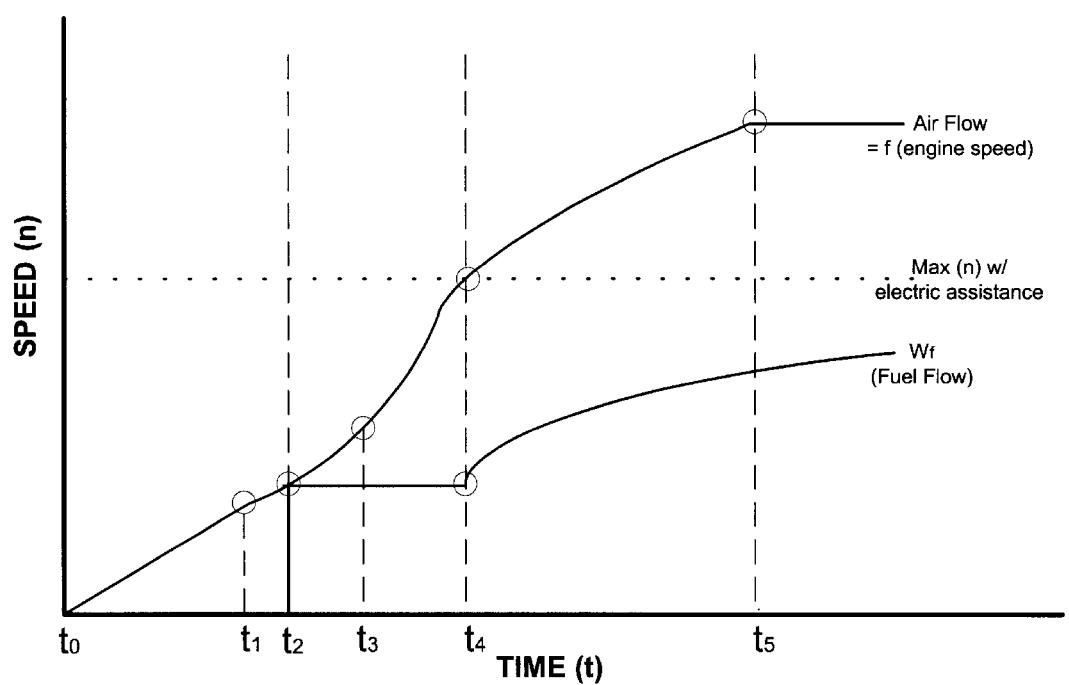
FIG. 5 is a graph of gas turbine engine speed and fuel flow versus time for a gas turbine engine ignition and start up method according to the present invention.
Figure 6:
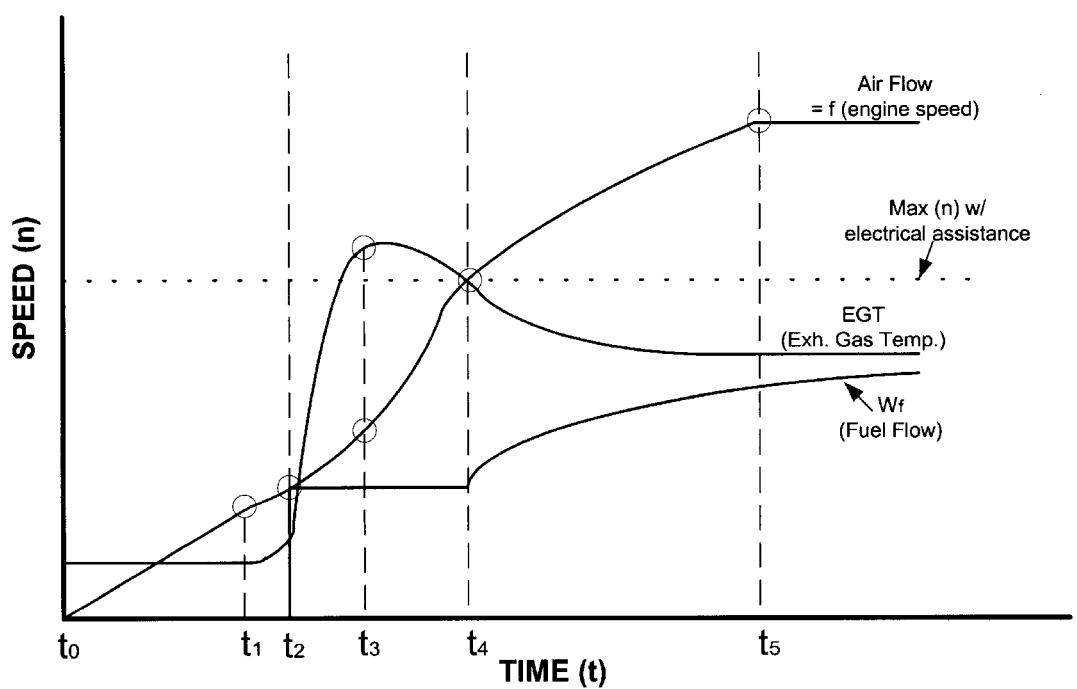
FIG. 6 shows the graph of gas turbine engine speed and fuel flow versus time for a gas turbine engine ignition and start up method of FIG. 5 including exhaust gas temperature versus time.
Figure 7:
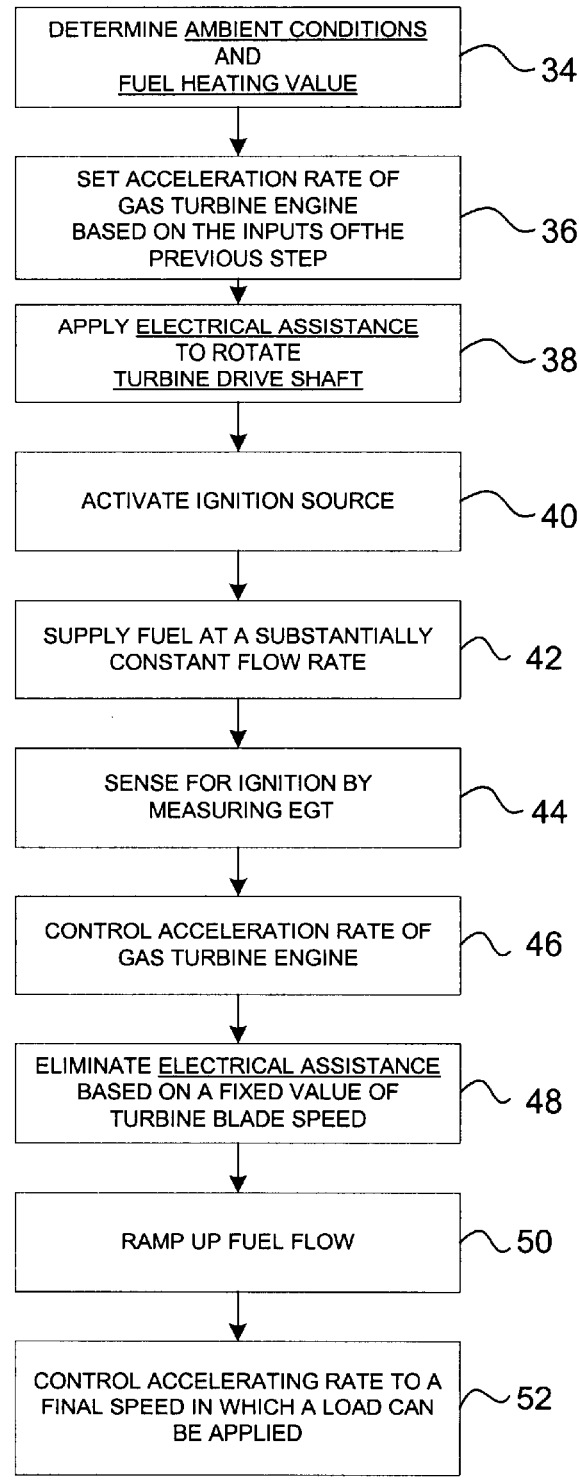
FIG. 7 is a schematic flow diagram representing the gas turbine ignition and start up method according to the present invention.

The method for ignition and start up of a gas turbine engine according to the present invention is illustrated in FIGS. 5, 6, and 7. FIG. 5 is a graphical presentation of engine airflow "f" and fuel flow "Wf" versus time "t". FIG. 6 is a graphical presentation of engine airflow "f", fuel flow "Wf" and exhaust gas temperature "EGT" versus time "t". FIG. 7 illustrates the control logic of the gas turbine ignition and start up method of the present invention in flow chart format and generally corresponds to FIGS. 5 and 6.

Referring to FIGS. 5, 6, and 7, at time "$t_0$" ambient conditions and fuel heating value is determined in step 34 The ambient condition includes both ambient temperature and ambient atmospheric pressure. The fuel heating value is the heat generated when 1 pound or 1 cubic foot of combustible material is completely burned, usually at a standard temperature and pressure. The fuel heating value varies with temperature and pressure. In step 36, an acceleration rate of the gas turbine engine is set based on the input of the previous step 34. In step 38, at time "$t_0$", electrical assistance is applied to stan rotation of the turbine drive shaft 18, which causes the compressor blades 14 and turbine blades 16 to rotate. This can occur trough a battery supplying power to a start inverter, which can act as a motor to drive the compressor/turbine via the electric power supplied thereto. Other arrangements can be provided to electrically drive the turbine/compressor, such as an electric motor directly coupled to the drive shaft to drive the turbine/compressor. The motor can be driven by an outside electrical power source and/or a battery. In step 40, at time "$t_1$", an igniter is ignited based on the ambient conditions in step 34 and the rotational speed of the compressor blades 14 and turbine blades 16 in step 38. In step 42, at time "$t_2$", fuel is initially supplied to the combustor 10 at a substantially constant flow rate. After initiating the flow of fuel at a substantially constant rate, the fuel flow is increased non-decreasingly until the engine drives a load. The fuel orifices 30 in the combustion chamber 28 are either in fluid communication with a single fuel source or multiple fuel sources. In step 44, a heat sensor can be used to sense for ignition by measuring the exhaust gas temperature, as shown in FIG. 6. When ignition occurs, there is a significant increase in the exhaust gas temperature which causes the air flow "f" to increase as the gas turbine engine speed increases, whereby the turbine blades 16 are caused to be rotated by the combination of the gases passing across the turbine blades 16 and rotation of the turbine drive shaft 18 by electrical assistance. After ignition has occurred, the acceleration rate of the gas turbine engine is controlled at a steady rate (step 46). In step 48, at time "$t_4$", electrical assistance to the gas turbine engine is eliminated based on the maximum speed or fixed speed value of the turbine blades 16, which is determined by the torque versus speed characteristics of the starter motor. The inverter then can cease to provide power to drive the turbine/compressor. As the turbine is driven by the products of combustion, then the percentage of power supplied by the battery to drive the compressor decreases. In other words, initially 100% of the power to drive the turbine/compressor is supplied by the electrical power through the starter motor. After ignition, this percentage decreases and mare percentage of power to drive the turbine/compressor is supplied via the products of combustion until the electrical power is eliminated and the turbine/compressor is completely driven by products of combustion and air. In step 50, also at time "$t_4$", the fuel supplied to the combustor is ramped up so as to increase the speed of the gas turbine engine to a final speed to which a load may be applied. In step 52, the speed of the gas turbine engine is increased at a controlled acceleration rate until the final speed is reached. Of course, the airflow rate is controlled by the rotational speed of the compressor and pressure within the combustor chamber.

It is preferred in a situation where the combustor 10 is idle at an idle speed, then fuel can be supplied at a constant flow rate so that the combustor 10 is operating on a slower idle speed without any electrical assistance to the arrangement 12, such as shown at "$t_4$" in FIGS. 5 and 6.

Figure 8:
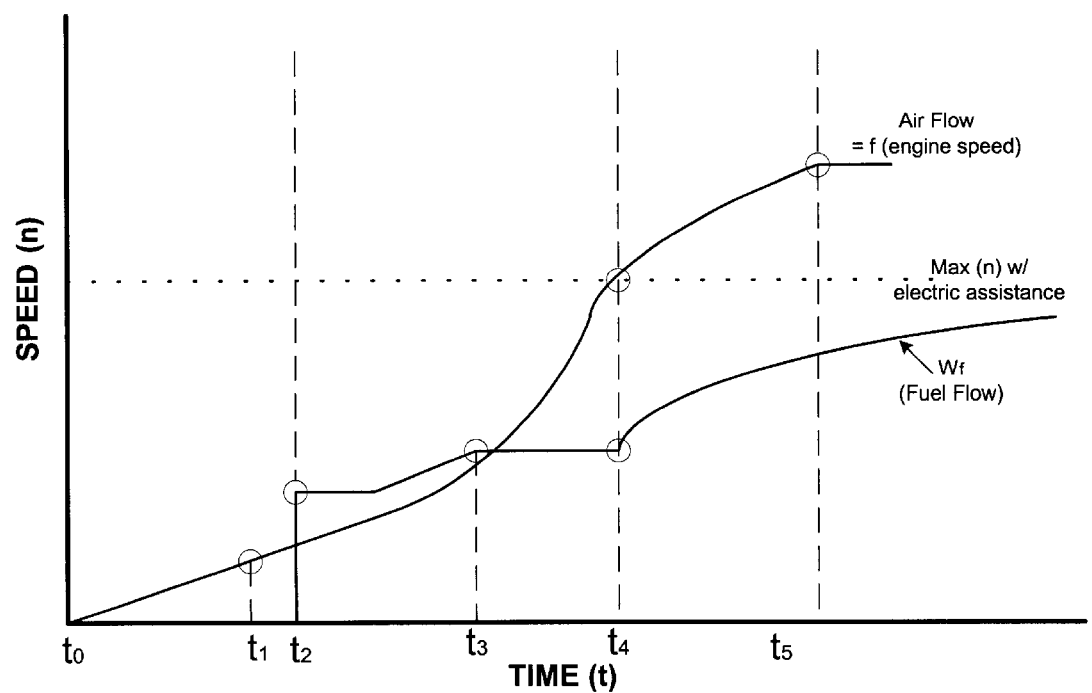
FIG. 8 is a graph of gas turbine engine speed and fuel flow versus time for a gas turbine engine ignition and start up method according to the present invention.

In one embodiment of the present invention where ignition does not occur after a fixed period of time at the substantially constant flow rate of fuel, the flow rate is increased until ignition does occur (shown in FIG. 8 at "$t_3$"). In this case, ignition occurs at "$t_4$". If ignition is still not achieved after a specified period of time, the system is stopped and purged. For example, after time "$t_5$" the EGT does not increase to a value to indicate ignition, then the system is stopped and purged.

It will be understood by those skilled in the art that while the foregoing description sets forth in detail preferred embodiments of the present invention, modifications, additions, and changes might be made thereto without departing from the spirit and scope of the invention.

I claim:

1. A method of starting a gas turbine engine, comprising the steps of:
   a. accelerating a gas turbine engine at a preset acceleration rate to a speed to provide a supply of combustion air to a combustor for ignition of said gas turbine engine, wherein said preset acceleration rate of said gas turbine engine is determined based upon ambient conditions and fuel heating value;
   b. activating an ignition source for said combustor of said gas turbine engine; and
   c. initiating a flow of fuel to said combustor at a substantially constant rate to provide an optimum supply of fuel to said combustor and maintaining said constant rate until the correct fuel-to-air ratio is achieved and ignition of said gas turbine engine occurs, and after initiating the flow of fuel at a substantially constant rate, increasing the fuel flow non-decreasingly until the engine drives a load.

2. The method as claimed in claim 1, further comprising the step of determining ambient conditions and fuel heating value.

3. The method as claimed in claim 2, wherein said ambient conditions comprise ambient temperature and atmospheric pressure.

4. The method as claimed in claim 2, wherein said ignition source is activated based upon said ambient conditions and said speed of said gas turbine engine.

5. The method as claimed in claim 1, wherein said gas turbine engine is accelerated by applying electrical assistance.

6. The method as claimed in claim 5, further comprising the step of eliminating said electrical assistance to said gas turbine engine based upon a fixed value of said speed of said gas turbine engine.

7. The method as claimed in claim 1, further comprising the step of sensing for ignition after step c by using a heat sensor.

8. The method as claimed in claim 1, further comprising the step of sensing for ignition after step c by measuring exhaust gas temperature of said gas turbine engine.

9. The method as claimed in claim 1, further comprising the step of controlling an acceleration rate of said gas turbine engine after ignition has occurred.

10. A method of starting a gas turbine engine, comprising the steps of:
    a. accelerating a gas turbine engine at a preset acceleration rate to a speed to provide a supply of combustion air to a combustor for ignition of said gas turbine engine, wherein said preset acceleration rate of said gas turbine engine is determined based upon ambient conditions and fuel heating value;
    b. activating an ignition source for said combustor of said gas turbine engine;
    c. initiating a flow of fuel to said combustor at a substantially constant rate to provide an optimum supply of fuel to said combustor and maintaining said constant rate until the correct fuel-to-air ratio is achieved and ignition of said gas turbine engine occurs, and after initiating the flow of fuel at a substantially constant rate, increasing the fuel flow non-decreasingly until the engine drives a load; and
    d. controlling an acceleration rate of said gas turbine engine after ignition has occurred.

11. The method as claimed in claim 10, further comprising the step of determining ambient conditions and fuel heating value before step a.

12. The method as claimed in claim 11, wherein said ambient conditions comprise ambient temperature and atmospheric pressure.

13. The method as claimed in claim 10, wherein said gas turbine engine is accelerated by applying electrical assistance.

14. The method as claimed in claim 13, further comprising the step of eliminating said electrical assistance to said gas turbine engine based upon a fixed value of said speed of said gas turbine engine.

15. The method as claimed in claim 11, wherein said ignition source is activated based upon said ambient conditions and said speed of said gas turbine engine.

16. The method as claimed in claim 10, further comprising the step of sensing for ignition after step c by measuring exhaust gas temperature of said gas turbine engine.

17. A method of starting a gas turbine engine, comprising the steps of:
    a. determining ambient conditions and fuel heating value;
    b. setting an acceleration rate of a gas turbine engine based upon said ambient conditions and said fuel heating value;
    c. applying electrical assistance to accelerate said gas turbine engine at said preset acceleration rate, whereby a turbine drive shaft rotates causing compressor blades and turbine blades to rotate;
    d. activating ignition source for a combustor of said gas turbine engine;
    e. supplying a flow of fuel to said combustor of said gas turbine engine at a substantially constant rate until ignition of said gas turbine engine occurs, and after initiating the flow of fuel at a substantially constant rate, increasing the fuel flow non-decreasingly until the engine drives a load;

f. sensing for ignition of said gas turbine engine;

g. controlling an acceleration rate of said gas turbine engine after ignition has occurred;

h. eliminating said electrical assistance to said gas turbine engine based upon a fixed value of a speed of said turbine blades; and i. ramping up said flow of fuel to said combustor of said gas turbine engine to increase said speed of said gas turbine engine to a final speed to which a load is applied.

18. The method as claimed in claim 17, further comprising the step of controlling said acceleration rate of said gas turbine engine after said flow of fuel is ramped up to said combustor of said gas turbine engine.

* * * * *

UNITED STATES PATENT AND TRADEMARK OFFICE
CERTIFICATE OF CORRECTION

PATENT NO. : 6,766,647 B2 Page 1 of 1
DATED : July 27, 2004
INVENTOR(S) : Hartzheim It is certified that error appears in the above-identified patent and that said Letters Patent is hereby corrected as shown below:

Column 4,
Line 38, "to stan rotation" should read -- to start rotation --
Line 40, "trough a battery" should read -- through a battery --

Column 5,
Line 9, "and mare percentage" should read -- and more percentage --

Signed and Sealed this

Twenty-eighth Day of December, 2004

JON W. DUDAS
*Director of the United States Patent and Trademark Office*